Figure 1:
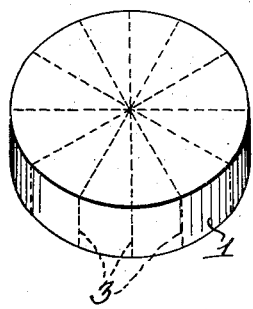

Dec. 6, 1932.   C. M. POLICASTRO ET AL   1,890,044
METHOD OF MANUFACTURING PREPORTIONED MOLDS OF EDIBLE
SUBSTANCES AND THE RESULTING PRODUCTS
Filed May 14, 1930   2 Sheets-Sheet 1

Inventors,
Charles M. Policastro, &
George W. Morrison by

J. Stuart Freeman,
Attorney.

Dec. 6, 1932.  C. M. POLICASTRO ET AL  1,890,044
METHOD OF MANUFACTURING PREPORTIONED MOLDS OF EDIBLE
SUBSTANCES AND THE RESULTING PRODUCTS
Filed May 14, 1930    2 Sheets-Sheet 2
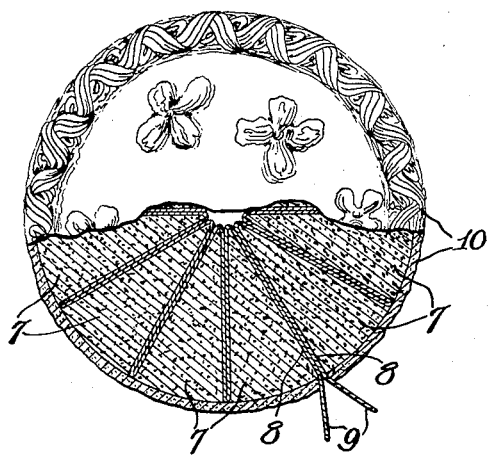
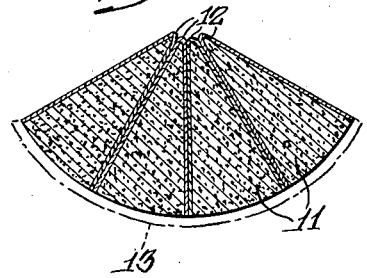
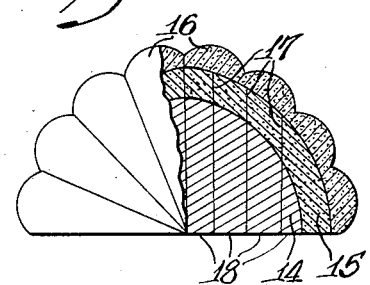
Inventors,
Charles M. Policastro &
George W. Morrison,
by J. Stuart Freeman
Attorney.

Patented Dec. 6, 1932

1,890,044

UNITED STATES PATENT OFFICE

CHARLES M. POLICASTRO, OF PHILADELPHIA, AND GEORGE W. MORRISON, OF UPPER DARBY, PENNSYLVANIA, ASSIGNORS TO ABBOTTS DAIRIES, INC., OF PHILADELPHIA, PENNSYLVANIA, A CORPORATION OF DELAWARE

METHOD OF MANUFACTURING PRE-PORTIONED MOLDS OF EDIBLE SUBSTANCES AND THE RESULTING PRODUCTS

Application filed May 14, 1930. Serial No. 452,269.

The object of the invention is to provide broadly improvements in the method of handling and serving ice cream, and particularly in the handling of such commodity in any shape or molded form larger than an individual portion.

While there has long been a demand for ice cream, water ices, frozen custard, and similar substances (hereinafter referred to as ice cream in its broadest sense) in the form of attractive molds, such as those representing frosted or "iced" cakes, melons, pies, hearts, and the like, the advent and increased use of so-called "dry ice" or "$CO_2$ ice" has presented new problems. This "ice", which is in reality a solidified gas, tends to harden the ice cream to a much greater degree than the common ice-and-salt packing, with the result that an ice cream mold but freshly removed from a "dry ice" package is frequently found to be too hard to conveniently cut with the implements usually found in a kitchen or upon a dining table, and it is for the dining table that the many artistically shaped and decorated forms of ice cream shapes have been especially designed.

An object therefore is to provide a method whereby the previously frozen ice cream of one or more flavors can be divided into the desired number of individual portions, assembled as an apparently integral unit, and then camouflaged by means of a shell of the same or differently flavored ice cream or the like, by means of a coating made of variously arranged and artistically decorated frosting, by softening and running together the material of the outer surfaces of the reassembled portions, or in any other desired and suitable manner.

A further object consists in the provision of a method and means whereby previously formed individual portions of ice cream may be reunited and thereafter although apparently comprising a single mold may be separated with the utmost ease in accordance with the original shape of such portions, the said method involving the hardening of the individual portions to such an extent that they will not accidentally unite, and said means in a modified form of the invention comprising either alone or in addition to such hardening the insertion of wax paper or other suitable material between said portions, and thereafter if desired covering the whole with a coating of ice cream, frosting, or similar substance, as hereinbefore referred to.

Figure 2:
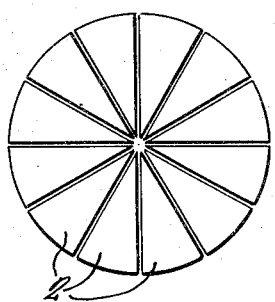
Figure 3:
Figure 4:
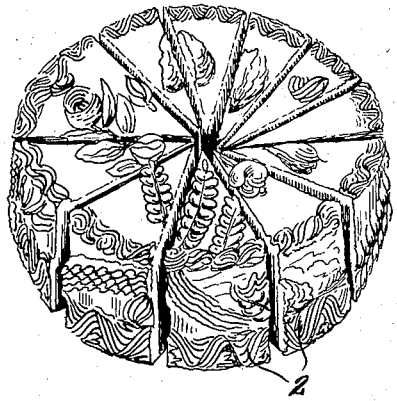

Having in mind these objects thus broadly stated, the invention comprises further details which are hereinafter brought out in the accompanying drawings, in which Fig. 1 is a perspective view of a substantially cylindrical mold of ice cream; Fig. 2 is a plan view showing the same mold after having been cut to provide the desired number of uniform portions for individual consumption; Fig. 3 is a perspective view of a mold in which the previously divided portions are reassembled and covered with a more or less elaborately decorated coating of suitable frozen frosting; Fig. 4 is a similar view of the same ice cream "cake" after having been re-divided for serving to individuals; Fig. 5 is a plan view of a similar "cake" partly in section to show a modified method of assembly; Fig. 6 is a fragmentary horizontal section of several sectors or portions of such "cake" assembled by a further modification of the invention; and Fig. 7 is an elevational view of an ice cream mold in the shape of a half melon, partly in section.

Referring to Figs. 1 to 4 of the drawings, in making a "cake mold," a plain substantially cylindrical body 1 of ice cream and/or water ices, or the like, is formed in any suitable manner, as by placing such material while in a semi-plastic condition in a hollow form or utensil (not shown) of the proper size and shape, after which it is permitted to harden. From such utensil the molded material may be readily extracted by the well-known manner of warming the former with water or other available medium. The mold is then cut by means of a suitably operated knife blade into the desired number of individual portions 2, the shape and size of which latter will vary with the many possible mold forms, the original mold being shown in Fig. 1 upon which dotted lines 3 have been placed (in the drawings only) to indicate the lines along which the blade operates to produce the symmetrically divided mold shown in Fig. 2. It is also to be understood that throughout this description and the appended claims the term utensil is used to denote the vessel in which ice cream is placed while semi-plastic in order to give to it the desired shape after it hardens, while the term mold is employed to designate the shape of the ice cream after having been given a predetermined form by means of a utensil or by a coating of any sort thereafter applied.

The collection of individual portions shown in Fig. 2 is then placed in an atmosphere of low temperature with the result that each portion hardens throughout as an inherently complete unit. Said portions may then be moved together to again comprise an apparent unit, which is thereafter ready for the application of suitable frosting 4, applied in any desired manner and characterized by any one of an infinite number of appearances, as for instance that shown in Fig. 3, which represents a baked cake artistically "iced" (as that term is used by bakers). However, as the portions are moved together it has been found to be advantageous to insert a short distance within one of the severances and protruding slightly therefrom a relatively small card or disc 5, which extends freely from the mold even after the latter has been frosted. In this condition the mold is returned to the hardening room or other atmosphere of low temperature so that the frosting will in turn harden and in effect form a unitary shell about the top and radially outer sides of said portions collectively, and at the same time serve to hold them together.

The mold is then ready to be packed for shipment and/or storage in any approved manner as within a carton also containing the so-called "dry ice", and if removed from such container before such "ice" has entirely dissolved or evaporated, the mold will be found to be quite hard. The mold should be retained in relatively confined association with the "dry ice" or equivalent refrigerant until a short time, such as from a few minutes to an hour or more, before serving, the time of permissible exposure before softening and uniting of the individual portions being dependent upon the degree of hardness of the mold, the surrounding temperature, the kind or kinds of ice cream, or the like, comprising the mold, etc. The card 5 may then be withdrawn and the end portion of a knife blade inserted in the resulting crevice 6, a slight turning or prying by the knife resulting in the complete severance of the mold, usually in a diametrical line and always between portional subdivisions. In this manner the "cake" mold is separated into two or more parts, and thereafter the knife may be inserted, either through the frosting in approximate alignment with the original cuts, or successively into the vertical lines of severance as they appear at the center of the two first parted mold sections. In this manner the mold is separated into the predetermined individual portions of Fig. 2, each carrying a proportionate part of the frosting as shown in Fig. 4.

Referring to Fig. 5, a slight modification of the invention is illustrated as comprising a mold comprising individual portions 7, which after original severance have been maintained in complete separation one from another by means of one or more elongated strips 8 of wax paper or the like, which may be ticket-folded and double thicknesses of such paper inserted between adjacent ice cream portions, the ends 9 of the strip or strips protruding radially beyond the periphery of the unit, while the radial limit of the doubled thicknesses of the strip or strips remain within such periphery. Application of the frosting 10 to the top and vertical sides of the mold and hardening the same then produces a camouflaged unit mold as hereinbefore described, with only the strip ends protruding therefrom. When it is desired to separate the mold into the predetermined individual portions, it is only necessary to manually pull the said ends away from each other, with the result that the mold at first breaks into two parts, and as a continuance of such pull is made upon the strip ends the several portions are finally completely separated one from another and of course from such strip or strips.

Referring to Fig. 6, a fragmentary portion of a mold is shown as comprising a plurality of portions 11, separated by V-shaped wax paper 12, or similar elements, which are separate from one another at their adjacent ends, instead of being connected to form one or more strips of greater length. Otherwise, a mold formed in this manner is both created and preserved as hereinbefore described and may be surrounded by frosting or other coating as indicated by the dot-and-dash line 13.

Fig. 7, on the other hand, illustrates what has been long referred to as a "melon" mold, having an exterior shape resembling a half melon, and structurally comprising one or more ice cream flavors, frozen custard, water-ice, or similar materials. In the form shown, a heart 14 is of one such material and an intermediate layer 15 is of another, while for the outside layer or covering 16 in this instance is chosen pistachio ice cream because of its usual green color, though this color and flavor are not essential and are but illustrative of many choices which may be made.

In the formation of this "melon" mold, all but the outside covering is assembled in any well-known manner and cut along the lines 17 substantially as shown. While thus slightly separated the individual portions 18 are hardened as hereinbefore described, again brought together and then placed in or covered by the outer layer to form a unit mold, etc., which in this case suggests the rind of a watermelon, but is intended to represent as well any manner of combined covering and portion-uniting shell which may be desired, said mold thereafter being maintained at a low temperature as by packing with "dry ice" until shortly before serving. When the mold is to be served, there is no difficulty experienced in cutting through the cover layer in substantial alignment with the severances, after which the pre-determined individual portions separate without effort. It is of course to be understood that this "melon" may also be provided with lines or other exterior means for indicating from without the approximate location of the portion divisions within, or the mold may be provided with one or more cards such as have been described as used in the "cake" mold.

Having thus described our invention, what we claim and desire to protect by Letters Patent of the United States is:—

1. The method of making an edible frozen confection mold, which consists in forming individual portions, hardening said portions at a sub-freezing temperature to prevent them from coalescing, and then coating a plurality of such portions with edible material after being assembled, and then hardening said coating to temporarily bind the same together.

2. The method of making an edible frozen confection mold, which consists in forming an original mold, severing the same to provide individual portions, hardening said portions at a sub-freezing temperature to prevent them from coalescing, then coating a plurality of such portions after being assembled with a unitary edible shell, and then hardening said shell to temporarily bind said portions together.

3. The method of making an ice cream mold, which consists in forming individual portions while separated, hardening said portions at low temperatures to prevent them from coalescing, assembling a plurality of such portions, spanning the lines of union between the portions of the resulting unit with an edible coating, hardening said coating at a low temperature to create a temporary and sole binding means for said portions, and maintaining the portioned mold at a sub-freezing temperature until substantially ready to separate the portions for serving.

4. The method of making an ice cream mold, which consists in forming an original mold, severing the same to provide detached individual portions, hardening said portions at low temperatures to prevent them from coalescing, assembling a plurality of such portions, coating the resulting unit with a frosting, hardening said coating at a low temperature to create a temporary and sole binding means for said portions, and maintaining the portioned mold at a sub-freezing temperature until substantially ready to separate the portions for serving.

5. The method of handling and serving ice cream, which consists in forming individual portions while separated, hardening said portions at low temperatures to prevent them from coalescing, assembling a plurality of such portions, spanning the lines of union between the portions of the resulting unit with an edible coating, hardening said coating at a low temperature to create a temporary and sole binding means for said portions and provide a unitary mold and maintaining the portioned mold at a sub-freezing temperature until substantially ready to separate the portions for serving, and then cutting or breaking said coating to permit separation of the mold into the initially individual portions.

6. The method of handling and serving ice cream, which consists in forming an original mold, severing the same to provide detached individual portions, hardening said portions at low temperatures to prevent them from coalescing, assembling a plurality of such portions, coating the resulting unit with a frosting, hardening said coating at a low temperature to create a temporary and sole binding means for said portions, and provide a unitary mold and maintaining the portioned mold at a sub-freezing temperature until substantially ready to separate the portions for serving, and then cutting or breaking said coating to permit separation of the mold into the initially individual portions.

7. An edible mold, comprising a core of individual portions of ice cream in juxtaposition, and a frozen shell of "icing" or "frosting" surrounding said portions sufficiently to bind them together as a unit, said shell when cut or broken along the general lines of union between said portions permitting the separation of said portions with parts of said shell adhering to each.

8. An edible mold comprising a core of individual portions of a frozen confection in juxtaposition, and a frozen shell of edible binding material surrounding said portions sufficiently to unite them as a unit, said shell when severed along the general lines of union between said portions permitting the separation of said portions with parts of said binding material adhering to each.

9. An edible frozen confection mold according to claim 8 having an element successively extending into the spaces between said portions to separate each portion from its neighbors.

10. An edible frozen confection mold according to claim 8 having a ticket-folded element whose sections extend between two of said portions to prevent the material of the adjacent portions from uniting.

11. An edible frozen confection mold according to claim 8 having an element only partially surrounding a portion to separate it from its neighbors.

12. An edible frozen confection mold according to claim 8 having an element formed of hinged sections successively extending into the spaces between said portions to separate each portion from its neighbors.

13. An edible frozen confection mold according to claim 8 having means extending through the coating to indicate a line of division between two adjacent portions within said coating.

14. An edible frozen confection mold according to claim 8 having means extending from between two adjacent portions and through the coating to indicate a line of division between two adjacent portions within said coating.

In testimony whereof we have affixed our signatures.

CHARLES M. POLICASTRO.
GEORGE W. MORRISON.